Patented Mar. 1, 1938

2,109,952

UNITED STATES PATENT OFFICE 2,109,952

METHOD OF PREPARING AMINOSULPHONIC ACID

Max Wyler, Blackley, Manchester, England, assignor to Imperial Chemical Industries Limited, a corporation of Great Britain No Drawing. Application August 3, 1937, Serial No. 157,225. In Great Britain November 16, 1936

5 Claims. (Cl. 23—190)

This invention relates to inorganic sulphonic acids and particularly to aminosulphonic acid or sulphamic acid which has the formula $H_2N$—$SO_3H$ and specifically to an improved process for the preparation of the same.

Sulphamic acid is a technically useful reagent and may be employed as a dehydrating agent.

This invention has as an object an improved process for the preparation of sulphamic acid. Further objects will appear hereinafter.

These objects are accomplished by the following invention wherein sulphamic acid is prepared by reacting urea with chlorosulphonic acid which may or may not be dissolved in an inert organic solvent.

The more detailed practice of the invention is illustrated by the following example, wherein parts given are by weight unless otherwise stated. There are of course many forms of the invention other than this specific embodiment. In particular, it may be said that when the mixture of urea and chlorosulphonic acid is heated, the rate at which the temperature is carried up is governed by the rate at which carbon dioxide and hydrogen chloride are evolved. Rapid evolution of gas will of course result in manipulative difficulties. Gas begins to be evolved at about 80° C. From that time the temperature rise is controlled so that the gas evolution does not become unmanageably rapid.

When interaction is complete and the mass is mixed with water as described in the example, the diluted mixture is allowed to stand until test portions show that the separation of crystals of sulphamic acid is complete. This may take from 2 to 18 hours according to circumstances.

As inert organic solvent any substance may be used that is not liable to be acted on by the acid, but I prefer to use tetrachlorethane or trichloroethylene as these solvents are both chemically suitable and economically unobjectionable.

Sixty parts of urea is gradually stirred into 240 parts of chlorosulphonic acid. The temperature is kept below 50° C. The urea dissolves. The mixture is slowly heated to 90° C. Carbon dioxide and hydrogen chloride are evolved and the mixture eventually sets to a mass of colorless crystals. This compound appears to be a double salt or molecular compound of sulphamic acid and acid ammonium sulphate. The crystals are stirred into 100 parts of ice cold water. After some hours the crystals now obtained are filtered off, washed with a little water, and dried. There is thus obtained 92 parts of sulphamic acid.

Instead of stirring the urea into chlorosulphonic acid it may be stirred into a mixture of 240 parts of chlorosulphonic acid and 240 parts of tetrachloroethane or trichloroethylene. The crystals (of double salt) are then readily filtered off and stirred into water as already described.

Inert organic solvents in general may be employed. The solvent is preferably one which dissolves the reacting materials but does not dissolve the double salt or sulphamic acid.

The above description and example are intended to be illustrative only. Any modification of or variation therefrom which conforms to the spirit of the invention is intended to be included within the scope of the claims.

I claim:

1. Process of preparing sulphamic acid which comprises bringing sixty parts of urea in gradual contact with 240 parts of chlorosulphonic acid, the temperature being maintained below 50° C., then heating the mixture to 90° C. until the evolution of carbon dioxide and hydrogen chloride ceases, stirring the crystalline product with 100 parts of water, filtering off the un-dissolved product and washing and drying the same.

2. In a process of preparing sulphamic acid, the step which comprises mixing urea with chlorosulphonic acid below 50° C. and heating the mixture to 90° C.

3. In a process of preparing sulphamic acid, the step which comprises heating urea with chlorosulphonic acid.

4. The process of claim 3 wherein the reaction is carried out in the presence of an inert organic solvent.

5. The process of claim 3 wherein the reaction is carried out in the presence of tetrachloroethane.

MAX WYLER.